Sept. 5, 1933.  I. H. JUDD  1,925,536
MEANS FOR TRANSPORTING VEHICLES AND THE LIKE
Filed April 4, 1932  3 Sheets-Sheet 2
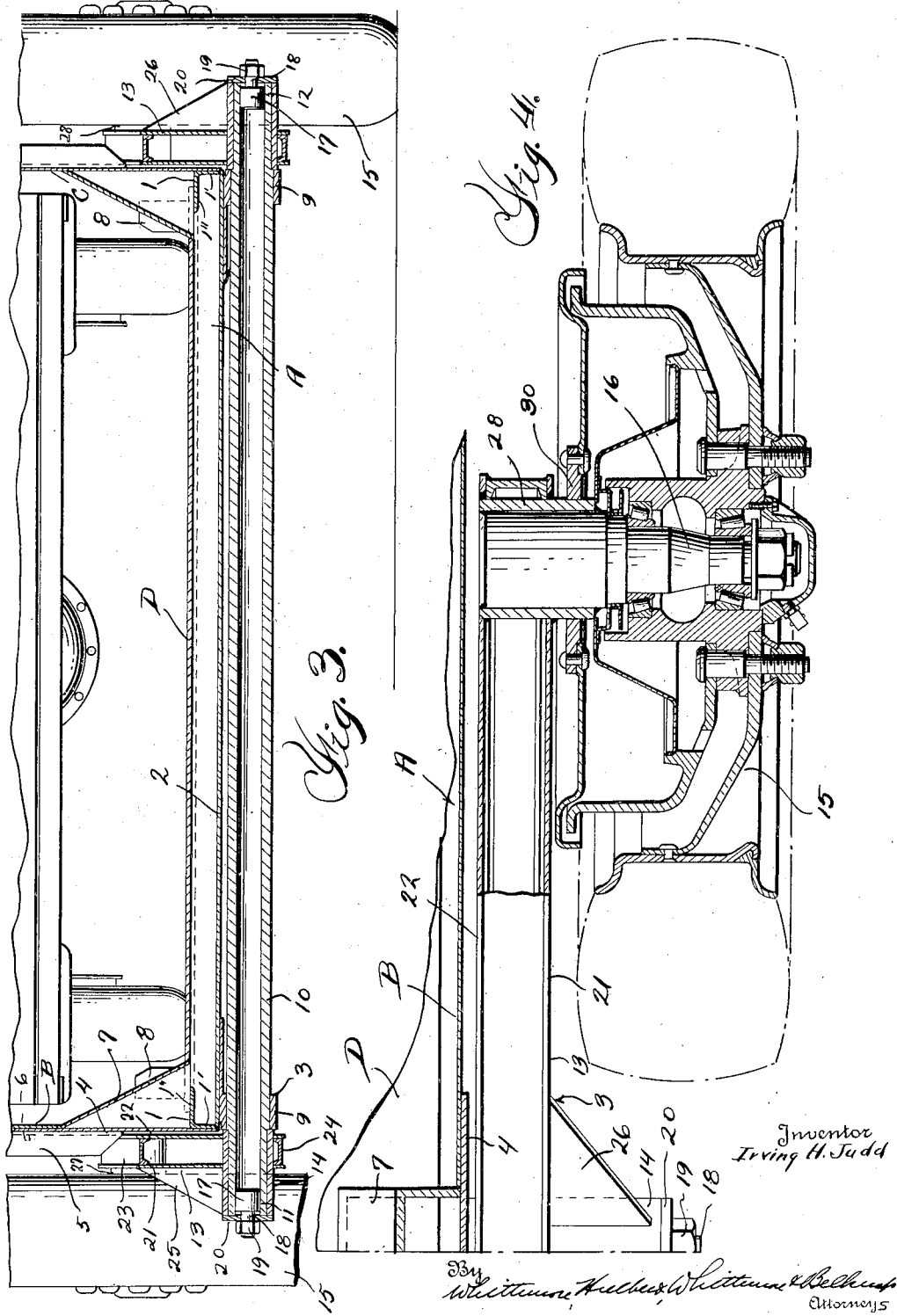
Inventor
Irving H. Judd

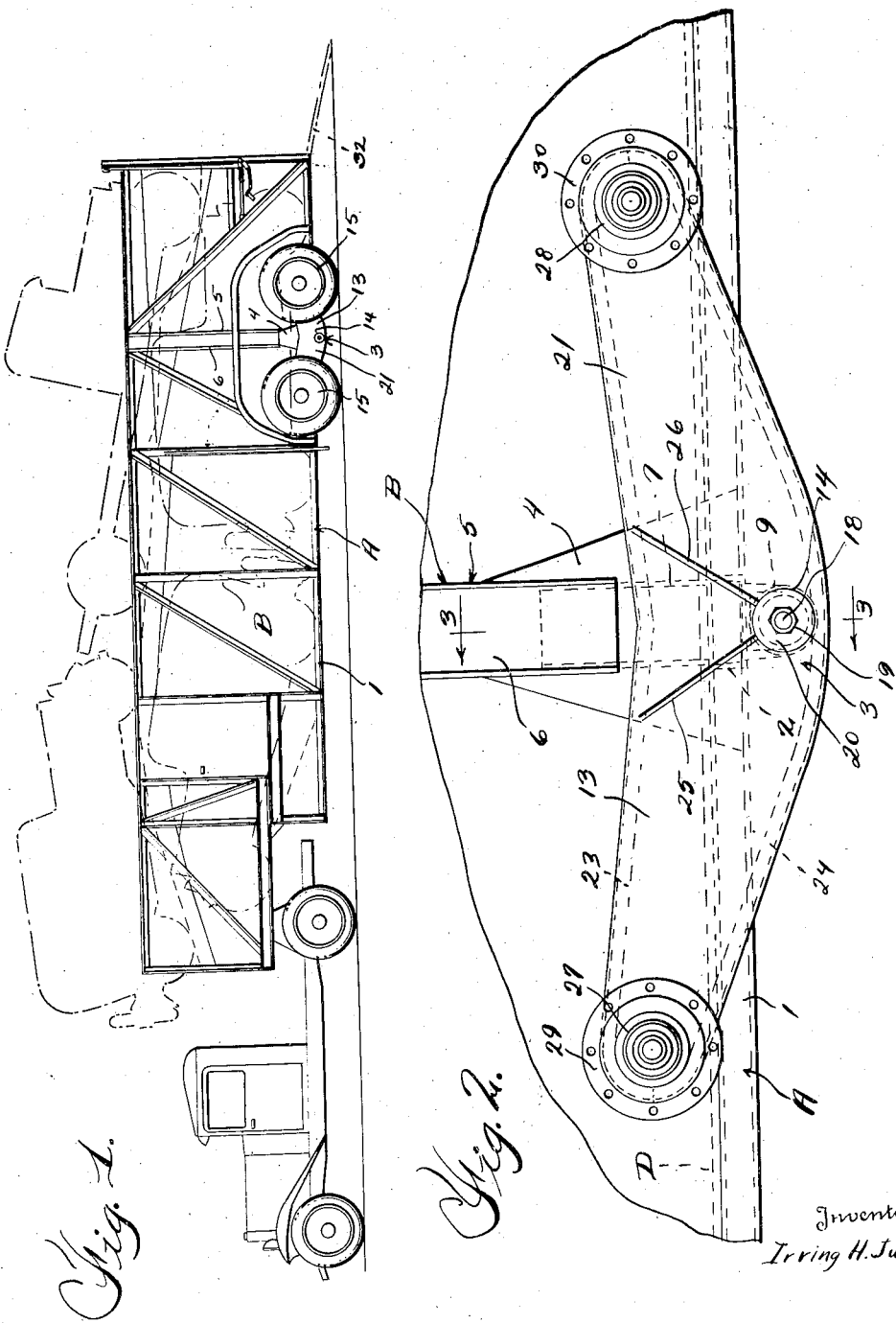

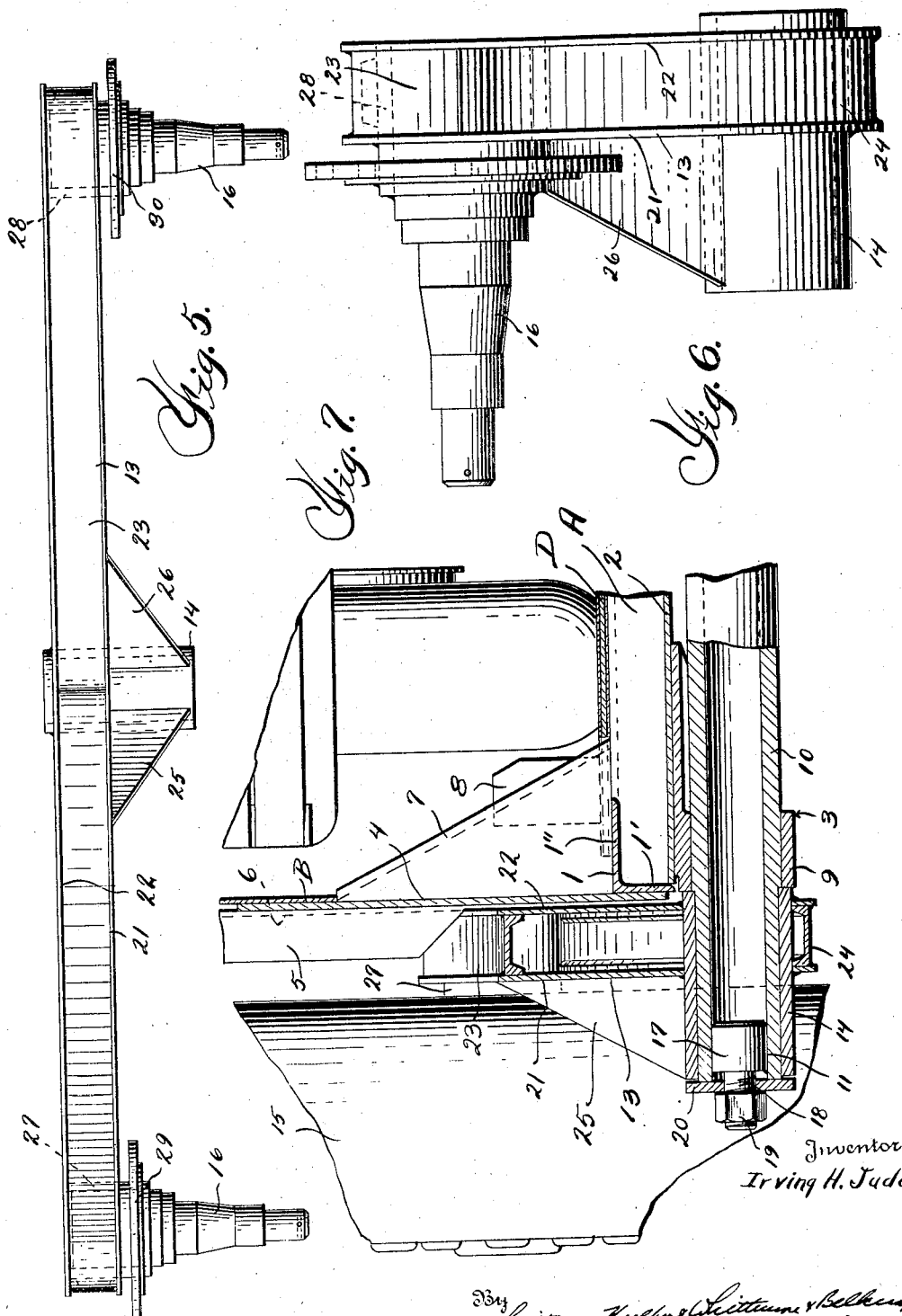

Patented Sept. 5, 1933

1,925,536

UNITED STATES PATENT OFFICE 1,925,536

MEANS FOR TRANSPORTING VEHICLES AND THE LIKE

Irving H. Judd, Detroit, Mich., assignor to Whitehead & Kales Company, River Rouge, Mich., a corporation of Michigan Application April 4, 1932. Serial No. 603,191

13 Claims. (Cl. 280—80)

This invention relates generally to means such as semi-trailers for carrying and transporting motor vehicles, and consists of certain novel details of construction, combinations and arrangements of parts, that will be hereinafter more fully described and particularly pointed out in the appended claims.

In the accompanying drawings:

Figure 1 is a side elevation of a semi-trailer embodying my invention;

Figure 2 is an enlarged fragmentary side elevation of the trailer with the tandem wheels removed;

Figure 3 is a vertical sectional view taken on the line 3—3 of Figure 2;

Figure 4 is an enlarged fragmentary horizontal sectional view through the rear axle assembly of the trailer;

Figure 5 is a top plan view of one of the walking beams and associated parts;

Figure 6 is an end elevation of the structure illustrated in Figure 5;

Figure 7 is an enlargement of a portion of Figure 3.

Heretofore the tandem wheel constructions have included dual axles that extended across the vehicle and the structures have been such that when the axles rocked relative to one another an objectionable twisting action was set forth. Radius rod constructions were used to eliminate the twisting but such constructions added to the cost of manufacturing and made the vehicles too expensive. With the present invention, however, the twisting is obviated and the radius rods have been dispensed with entirely so that the desired results are obtained by the use of fewer parts.

Referring now to the drawings, A is the chassis; B and C respectively are side frames, and D is the flooring of a semi-trailer embodying my invention. As shown, the chassis A is of the drop frame type and includes a pair of longitudinally extending beams 1, a plurality of transversely extending bars 2, and a dual walking beam axle assembly 3. Preferably the beams 1 are inverted L-shape in configuration and are arranged so that the upright portions 1' thereof are spaced apart a distance slightly in excess of the normal width of an automobile and the horizontal portions 1'' thereof are spaced apart a distance slightly less than the normal width of an automobile. The bars 2 extend between the beams 1 in the horizontal plane thereof and are terminally welded thereto at spaced points longitudinally thereof. The flooring D rests upon and is secured to the beams 1 and bars 2 and is preferably formed of sheet metal. Preferably the width of the flooring is substantially equal to the normal width of an automobile. The side frames B and C respectively extend upwardly from the beams 1 beyond the outer longitudinal edges of the flooring and include triangular plates 4 secured to the outer sides of the beams, and uprights 5 of channel configuration having their bases 6 secured to said plates 4. Channel braces 7 of triangular configuration extend between and are terminally secured to the plates 4 and beams 1 and adjacent bars 2 to strengthen and reinforce the structure while strips 8 of wood are secured upon the flooring B at opposite longitudinal edges thereof and serve as guides for the tires of the automobiles constituting the cargo or freight as they are loaded upon or unloaded from the trailer.

The dual walking beam axle assembly 3 preferably includes a pair of heavy brackets 9 depending from one of the cross members 2 at opposite ends thereof, an axle 10 extending through the brackets 9 and having opposite ends 11 and 12 respectively thereof projecting outwardly beyond the side frames B and C, a pair of walking beams or elongated rockers 13 upon the outer sides of the plates 4 and having tubular portions or hubs 14 substantially midway of their ends pivotally mounted on the projecting ends 11 and 12 respectively of the axle 10, and ground engaging wheels 15 arranged in tandem upon the outer sides of the walking beams and rotatably mounted on spindles 16 projecting laterally outwardly from the said beams 13 at opposite ends thereof. As shown, the axle 10 is tubular in form and has opposite ends thereof closed by the heads 17 of bolts 18 that project therefrom and constitute extensions thereof. Nuts 19 threadedly engage the bolts 18 while plates 20 are sleeved upon the bolts 18 between the nuts 19 and the outer ends of the axle 10 and cooperate with the brackets 9 to retain the tubular portions 14 of the walking beams in proper position longitudinally of the axle. Referring to the walking beams 13; 21 and 22 respectively are parallel elongated plates sleeved upon and welded to the tubular portions 14 adjacent their inner ends; 23 and 24 respectively are inwardly opening channels located between and welded to said plates at the curved longitudinal edges thereof; 25 and 26 respectively are plates of triangular configuration diverging upwardly from the tubular portions 14 to the outer plates 21 and bracing and reinforcing the structure; 27 and 28 respectively are short tubes extending through and welded to the plates 21 and 22 at opposite ends thereof and receiving and welded to the inner ends of the laterally projecting wheel spindles 16; and 29 and 30 respectively are plates sleeved upon and welded to the tubes 27 and 28 respectively adjacent their outer ends and constituting brake adaptors. The wheels 15 may be any suitable construction and are rotatably mounted on the spindles 16 in proper association with the brake adaptors just mentioned.

Thus from the foregoing it will be apparent that I have provided a drop frame trailer having an over-all or outside width that is within the statutory limits and that is constructed in such a way that the upright sides B and C and flooring D are between the walking beams 13. Thus the flooring D is lower and the automobiles to be carried may be loaded on to said flooring by shorter and lighter skids 32 and may be driven lengthwise of the flooring between the upright sides without encountering any obstacles, raised portions, etc., over the rear axle. The wheel spindles 16 are short and project laterally outwardly from the walking beams 13, hence it is unnecessary to have such spindles extend across the trailer as in all other equipment. Moreover, it is possible with my construction to have an upper deck at a lower elevation so that the over-all height when loaded with automobiles will be less than heretofore.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A vehicle chassis including an axle, a pair of walking beams on the axle at opposite ends thereof, a pair of longitudinally extending beams between said walking beams, cross bars extending between said longitudinally extending beams and brackets secured to one of said cross bars and having aligned openings receiving said axle.

2. In a vehicle, a dual walking beam axle assembly including an axle, a pair of supporting brackets for the axle, headed elements secured in and projecting from opposite ends of the axle, walking beams having tubular portions sleeved on the axle upon the outer sides of the brackets, and means carried by the headed elements and cooperating with the brackets for maintaining the beams in proper position longitudinally of the axle.

3. In a vehicle chassis structure, a frame, a bracket rigid with the frame at one side thereof, a walking beam beside and substantially parallel to said frame, an axle extending through the bracket and walking beam, and means carried by the axle and cooperating with the bracket for holding the walking beam in proper position relative to said frame.

4. A vehicle chassis having a frame, brackets rigid with the frame at opposite sides thereof, walking beams beside said brackets, an axle extending through the brackets and walking beams, and means carried by the axle and cooperating with the brackets for holding the walking beams in proper position relative to said frame.

5. In a vehicle chassis structure, a frame, an axle beneath and projecting beyond one side of said frame, a bracket secured to the frame at one side thereof and having an opening receiving the axle, a walking beam sleeved on the axle beside the frame, a member secured to and projecting endwise from the axle, and means carried by said member and cooperating with the bracket for holding the walking beam in proper position relative to said frame.

6. In a vehicle chassis structure, a frame, a bracket secured to one side of said frame at one edge thereof, an axle extending through the bracket and having a tubular end portion, a walking beam sleeved on the axle beside the edge aforesaid of the frame, a headed element secured in and projecting endwise from the tubular end portion of the axle, and means for holding the walking beam on the axle in proper position relative to the bracket including a member sleeved on the headed element and closing the tubular end portion of said axle.

7. In a vehicle chassis structure, a frame, a bracket secured to the under-side of said frame at one side edge thereof, an axle beneath the frame extending through said bracket, a walking beam having a transversely extending tubular portion sleeved freely on the axle beside the bracket, and means cooperating with the bracket for holding the walking beam in proper position relative to the frame, including an abutment member carried by the axle in spaced relation to the bracket.

8. A semi-trailer having walking beams upon opposite sides thereof, an axle extending transversely of said trailer and terminally connected to said walking beams, ground engaging wheels arranged in tandem upon opposite ends of and connected to said beams, and means for carrying automobiles extending longitudinally of said trailer throughout substantially its entire length in a substantially horizontal plane beneath the axis of rotation of said wheels and above said axle.

9. A semi-trailer having side frame members spaced to provide clearance therebetween for vehicles to be transported, means between said side frame members for carrying automobiles, an axle extending transversely of the trailer beneath said means, walking beams rockably engaging said axle upon opposite sides of the trailer, spindles projecting outwardly from said walking beams at opposite ends thereof above the means aforesaid, and ground engaging wheels mounted on said spindles.

10. A semi-trailer having side frame members spaced for receiving automobiles therebetween, means between said side frame members for carrying automobiles, an axle extending transversely of the trailer beneath said means, walking beams rockably engaging said axle upon the opposite sides of said trailer having the ends thereof extending upwardly above the level of said means, spindles projecting outwardly from the walking beams at opposite ends thereof, tandem wheels engaging said spindles, and means intermediate the ends of the walking beams for bracing said beams upon said axle.

11. A semi-trailer having an axle extending transversely thereof, walking beams pivoted intermediate their ends upon said axle, one upon each side of said trailer, spindles rigid with and projecting laterally from said walking beams at opposite ends thereof, said spindles being in a common horizontal plane above said axle, ground engaging wheels carried by said spindles, and a deck extending longitudinally of the trailer above the axle but beneath the horizontal plane aforesaid of said spindles.

12. A semi-trailer having a non-rotating axle extending transversely thereof, walking beams upon opposite sides of said trailer fulcrumed intermediate their ends on said axle, means at opposite ends of said axle for holding said walking beams against displacement relative to said trailer, spindles rigid with and projecting laterally from said beams at opposite ends thereof and having their outer ends free, ground engaging wheels on said spindles, and automobile carrying means extending longitudinally of the trailer above the axle but beneath the spindles.

13. A semi-trailer of the class described, having a non-rotating axle extending transversely across the same, ground engaging wheels supported from said axle upon opposite sides of said trailer with their axis of rotation above the horizontal plane of the axle, and a platform extending longitudinally of the trailer between said wheels beneath the axis of rotation thereof but above the plane aforesaid of said axle.

IRVING H. JUDD.